United States Patent Office 3,283,421
Patented Nov. 8, 1966

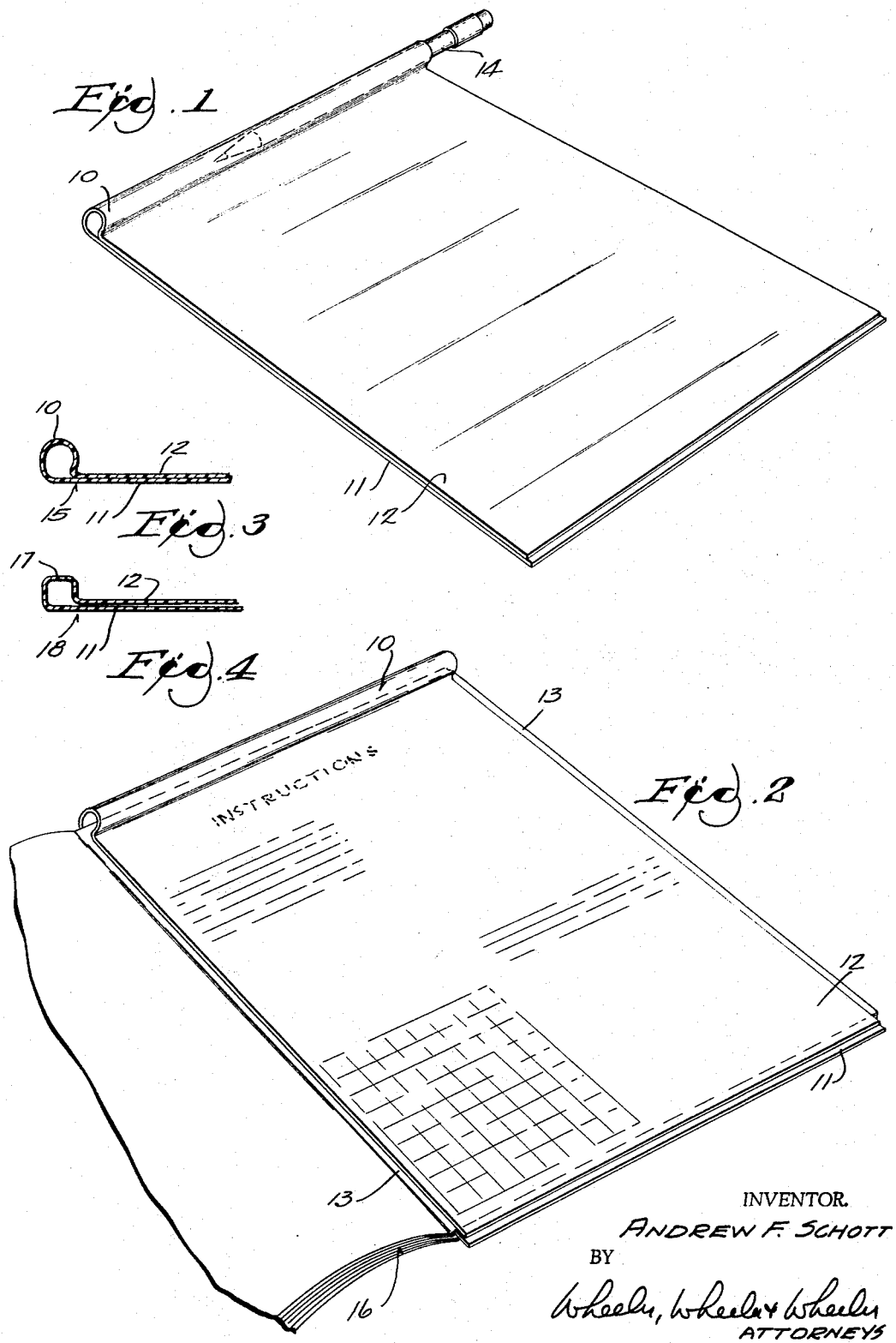

3,283,421
EDUCATIONAL WORKSHEET
Andrew F. Schott, Rte. 1, Green Lake, Wis.
Continuation of application Ser. No. 292,852, July 5, 1963. This application Oct. 30, 1964, Ser. No. 407,923
5 Claims. (Cl. 35—61)

This invention relates to improvements in educational worksheets, and particularly to such a worksheet made in one piece.

This application is a continuation of my copending application Serial No. 292,852, filed July 5, 1963, now abandoned.

The present invention improves upon the educational worksheet shown in my United States Patent No. 3,084,459 granted April 9, 1963. In the prior patent aforesaid, the backboard and transparent scribing top sheet are fabricated separately and are bound together at the top of the worksheet assembly, together with a separately fabricated pencil receiving tube. According to the present invention, the backboard, the scribing top sheet and the pencil receiving tube are fabricated unitarily out of a single sheet of plastic. The workpiece plastic sheet is bent back upon itself and a pencil receiving tube is formed at the bend. The plastic sheet portion at one side of the bend overlies the plastic sheet portion at the other side of the bend in juxtaposed relation and receives in use a text sheet therebetween.

Other objects, advantages and features of the invention will appear from the following disclosure in which:

FIGURE 1 is a perspective view of an educational worksheet embodying the invention.

FIGURE 2 is a perspective view showing said educational worksheet in use.

FIGURE 3 is a fragmentary cross sectional view through one form of educational worksheet embodying the invention.

FIGURE 4 is a fragmentary cross sectional view taken through a modified form of the invention.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In accordance with the present invention, a single sheet of heat moldable plastic material, such as a high impact styrene or vinyl material is heated intermediate its ends and is bent back upon itself. The sheet material at the bend is concurrently formed into a pencil receiving tube 10. The sheet material at one side of the tube 10 provides a backboard 11 and the sheet material at the other side of the bend provides a top scribing sheet 12. The scribing sheet 12 may be given a legibly inscribable surface by coating it with a water soluble coating of dried erasable coating solution, as disclosed in my prior patent aforesaid. The sheet material is transparent for viewing the text sheet 13 which intervenes between the backboard 11 and top sheet 12, in use. The top sheet, backboard and text sheet are substantially coextensive in area and are juxtaposed in parallel planes.

The tube 10 is desirably in the form of a cylinder of circular cross section to receive and store a pencil 14. As shown in FIGURE 3, the tube 10 may be formed tightly, thus to develop inherent tension sufficient to bring sheets 11 and 12 into frictional contact in the area 15 where the tube is closed. Accordingly, the tube 10 will frictionally grip the top margin of the text sheet 13, as shown in FIGURE 2. Text sheet 13 may be loose or may be one sheet of a bound volume 16, as shown in FIGURE 2. The edges of the sheets 11, 12 are free of interconnection, except at bend 10, thus to facilitate interleaving the text sheet 13 therebetween.

Alternatively, the tube may be formed with a polygonal cross section. An example of this is shown in FIGURE 4, where tube 17 is square in cross section and in which the sheets 11, 12 are not in frictional contact in the area 18, thus to fit relatively loosely on the text sheet 13.

The tube 10 is desirably disposed wholly at one side of the plane occupied by the backboard 11. Accordingly, it will not interfere with the worksheet lying flat on any supporting surface, such as a desk top, etc.

Educational worksheets fabricated according to the present invention are much simpler in construction than those shown in my prior patent aforesaid, and can be fabricated at considerably reduced cost.

I claim:

1. In an educational worksheet for use with a text sheet, a one-piece legibly inscribable and erasable worksheet comprising a single sheet of plastic having an intermediate bend in the form of a pencil receiving tube, the plastic sheet portion at one side of the bend constituting a backboard for the text sheet and the plastic sheet portion at the other side of the bend constituting a transparent scribing top sheet overlying said text sheet, the backboard, and scribing top sheet being substantially coextensive in area and being disposed in juxtaposed parallel planes, said tube being tensioned to frictionally engage the top sheet against the text sheet and backboard.

2. The combination of claim 1 in which said tube is disposed wholly at one side of the plane occupied by the said backboard.

3. The combination of claim 1 in which the tube has a circular cross section.

4. The combination of claim 1 in which the tube has a polygonal cross section.

5. The combination of claim 1 in which the edges of the backboard and top scribing sheet are free of interconnection, except at said bend, to facilitate interleaving the text sheet therebetween.

References Cited by the Examiner
UNITED STATES PATENTS

| | | | |
|---|---|---|---|
| 885,420 | 4/1908 | Ansell | 281—30 X |
| 1,625,154 | 4/1927 | Rand | 129—16.8 X |
| 2,039,116 | 4/1936 | Rice | 281—42 |
| 2,409,814 | 10/1946 | Vargish | 40—11 X |
| 2,566,837 | 9/1951 | Huelsmeyer | 40—11 |
| 2,800,732 | 7/1957 | Duran | 40—11 |
| 2,861,309 | 11/1958 | Saviolides | 24—66 |
| 3,084,457 | 4/1963 | Schott | 35—66 |
| 3,102,739 | 9/1963 | Larson | 281—30 X |

EUGENE R. CAPOZIO, *Primary Examiner.*

JEROME SCHNALL, *Examiner.*

H. S. SKOGQUIST, *Assistant Examiner.*